March 2, 1965 H. S. TOLAN, JR 3,171,622
RESILIENT MOUNT
Filed Jan. 2, 1962 2 Sheets-Sheet 1
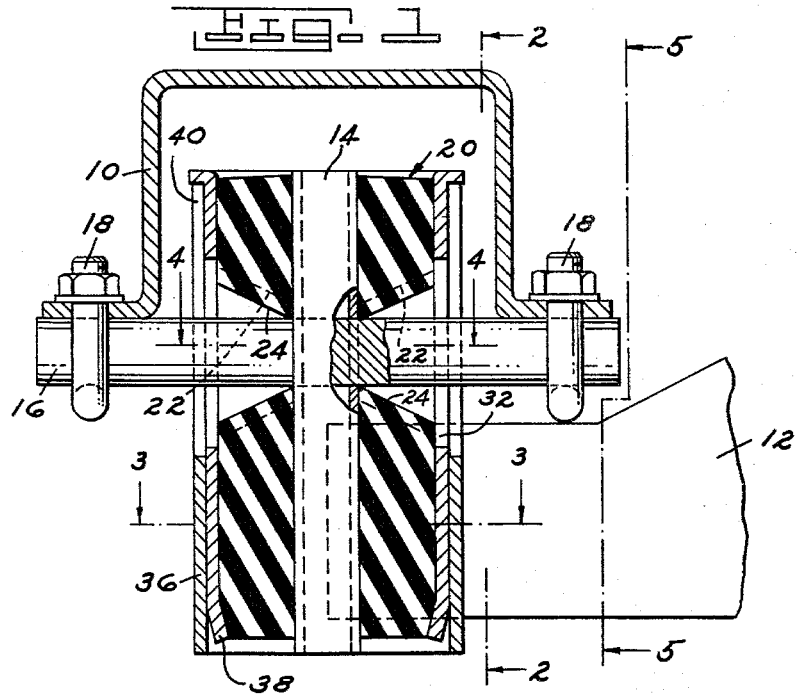
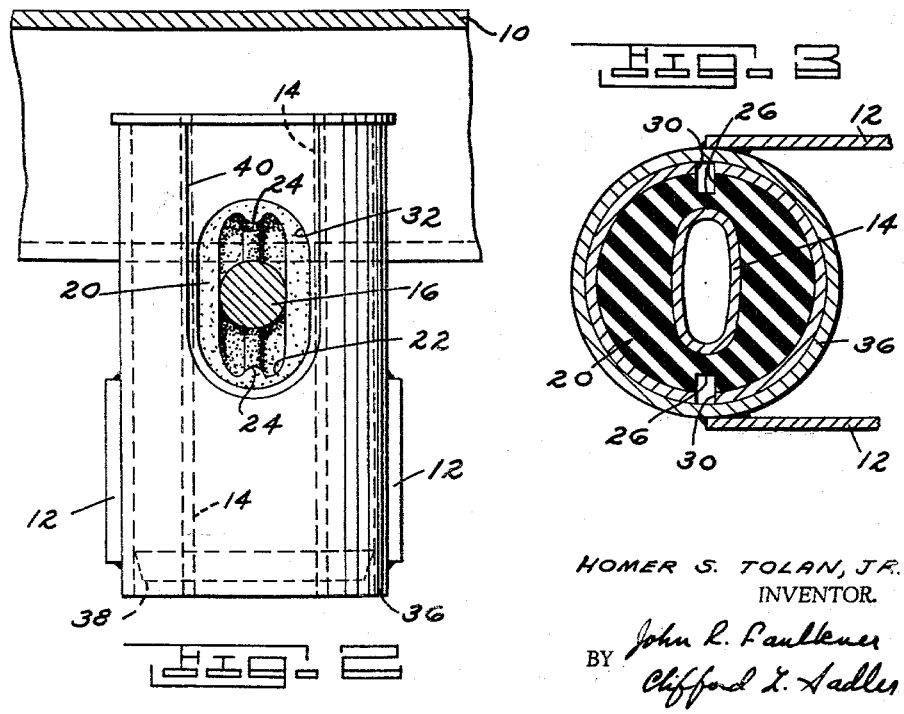
HOMER S. TOLAN, JR.
INVENTOR.
BY John R. Faulkner
Clifford L. Sadler
ATTORNEYS

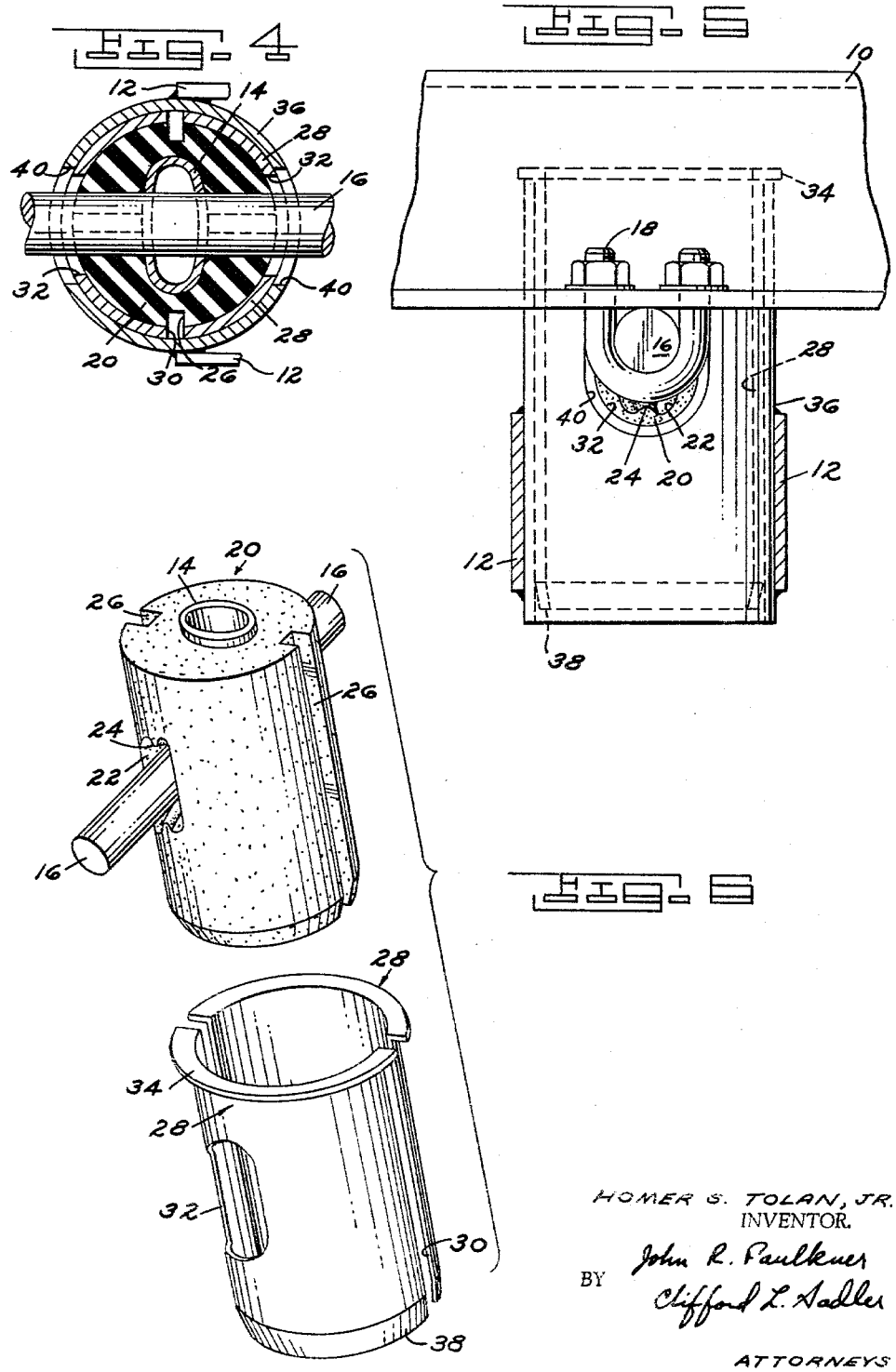

United States Patent Office 3,171,622
Patented Mar. 2, 1965

3,171,622
RESILIENT MOUNT
Homer S. Tolan, Jr., Dearborn, Mich., assignor to Ford Motor Company, Dearborn, Mich., a corporation of Delaware
Filed Jan. 2, 1962, Ser. No. 163,681
3 Claims. (Cl. 248—10)

The present invention relates to resilient mounts such as are used in vehicle suspensions and frame construction. As an example, the invention relates to a resilient mount that might be used to connect a frame cross member that supports engine and suspension structure to a frame side rail.

When a resilient mount is selected for connecting a frame cross member to a frame side rail of a motor vehicle, its purpose is to isolate vibration from the main portion of the vehicle. If the engine and suspension are supported on the isolated cross member, the load and engine vibrations will not be transmitted to the remainder of the frame and vehicle. It is desirable in providing such a mounting construction to have a relatively low load versus deflection rate in the direction of the vibration mode to be isolated. It is essential, however, that this same mounting have a relatively high rate in those directions where excess deflection could adversely affect steering stability and vehicle handling.

One of the conventional means of achieving these requirements is by the use of a bonded rubber bushing positioned such that the predominant mode of the vibration to be isolated tends to load the bushing in an axial direction and therefore, stress the rubber in shear. When this vibration mode happens to be vertical, the simplest way of attaching the bushing to the structure is through the use of either a cantilever pin or a bolt that acts as a cantilever pin when it is made secure in assembly. Such use usually requires that the bonded pin be either heat treated, of excessive size or both, and in addition, such as use requires certain elaboration in the design of the bushing.

An object of the present invention is to provide a resilient mount of the type described having a split shell coaxial rubber bushing that can be attached to a vehicle structure such that axial loading will be in the vertical direction but which embodies a straddle type of attachment instead of the more conventional cantilever pin type. This straddle attachment presserves the ease of assembly which is the predominant virtue of the cantilever pin arrangement without incurring the usual penalties. At the same time the straddle attachment employed in the invention avoids the assembly difficulties such as horizontal juggling or the use of a bolt on bracket that are inherent in most other straddle devices.

It is well known by those skilled in the art that a desirable attribute of mountings which are subjected to occasional overloads or to resonance conditions is a provision for overload stops or bumpers in order to prevent metal to metal contact of the resiliently supported structures. In most cases, these stops or bumps are contacted abruptly and excite an impact reaction in the supported structure.

An embodiment of this invention makes provision for overload stops that gradually increase in rate as deflection increases. These stops are integral with the rubber element of the mount so that snubbing action takes place within the confines of the mount. As overloads occur, the stressing of the rubber element in shear is gradually replaced by the stressing of a portion of the rubber in compression. This object is accomplished without significantly affecting the rubber-in-shear characteristics over the normal range of deflections.

The objects and advantages of the present invention will become more apparent from the following description and the accompanying drawings, in which:

FIGURE 1 is an elevational view in section of a mount constructed in accordance with the present invention.

FIGURE 2 is a sectional view taken along section lines 2—2 of FIGURE 1;

FIGURE 3 is a sectional view taken along section lines 3—3 of FIGURE 1;

FIGURE 4 is a sectional view taken along section lines 4—4 of FIGURE 1;

FIGURE 5 is a sectional view taken along section lines 5—5 of FIGURE 1; and

FIGURE 6 is an exploded view in perspective disclosing a portion of the mount.

Referring now to the drawings, wherein like reference numerals identify like parts throughout the various views. FIGURE 1 discloses a resilient mount such as might be used to connect a longitudinal frame member 10 of a motor vehicle to a cross-frame member 12.

The core of the mount comprises a cross-shaped piece having a vertical member 14 that is welded to a transverse member 16. As seen in FIGURES 3 and 4, the vertical member 14 has an elliptical cross-sectional configuration and is positioned with the major axis of the ellipse parallel to the longitudinal frame member 10. The outer ends of the horizontal piece 16 are secured to the frame member 10 by a pair of U-bolts 18.

The vertical piece 14 is surrounded by a generally cylindrical rubber element 20 that is secured thereto by bonding. A pair of outwardly diverging openings 22 are provided in the rubber element 20 to receive the transverse bar 16. At their inner ends these openings 22 have a width and height equal to that of the bar 16. A ridge 24 is provided on the surface of the openings 22 above and beneath the rod 16. The inner edge of the ridge 24 contacts the rod 16 at the latter's intersection with the vertical member 14.

A pair of axially extending grooves 26 are provided in the exterior surface of the rubber 20 in alignment with the major axis of the eliptical cross section of the vertical piece 14.

A pair of semi-cylindrical pieces or shells 28 surround the rubber element 20 and have their mating edges 30 in alignment with the grooves 26. A pair of openings 32 of size greater than the dimension of the mouth of the openings 22 in the rubber element 20 is provided in the pieces 28 to accommodate the transverse rod 16. The upper end of the cylindrical shells 28 have a radial flange 34 extending therefrom.

The cylindrical shells 28 surround the rubber element 20 with the rod 16 passing through the openings 32. The shells 28 are forced together to compress the rubber 20 and fitted within an outer cylindrical housing 36. The lower edge of the shells 28 have an inwardly converging portion 38 to permit the insertion of the internal members of the assembly within the cylindrical housing 36. The housing 36 has a pair of enlarged openings or slots 40 in alignment with the openings 22 and 32. The cross-frame chassis member 12 may be welded to the outer housing 36.

In the application of the present resilient mount to a vehicle, the frame 10 carries the sprung weight of the vehicle and the cross-frame member 12 is secured to the unsprung portions. Thus, there is a tendency for vertical displacement of the frame members 10 and 12. Because the vertical piece 14 is joined to the rubber 20 and carried by a sprung member and the outer shells 28 are also joined to the rubber 20 and carried by an unsprung structural member, this tendency for vertical displacement causes the rubber to be loaded in shear.

The axis of the vertical piece 14 is the major axis of the assembly and vibration having a vertical mode will be absorbed in shear loading of the rubber. Vibrations tending to have horizontal movement will be resisted by the compression loading of the rubber trapped between the shell piece 28 and the vertical piece 14.

Extreme vertical movement will cause the surfaces of the diverging openings 22 and particularly the ridges 24 to come into contact with the transverse bar 16. This action will produce compression loading of the rubber 20 and a subsequently higher and faster stress buildup than is produced by the shear loading of the rubber. Such higher stress buildup will arrest the vertical movement and functions as an internal stop or bumper construction.

The foregoing description presents an embodiment of the present invention providing a resilient mount that is characteristic partly by its directional spring rate characteristics and further by the efficient method in which it is assembled and mounted to the associated structure.

Modifications and alterations of this invention may occur to those skilled in the art that will come within the scope and spirit of the following claims.

I claim:

1. A resilient mount adapted to be interposed between first and second structures, said mount comprising a cylindrical resilient body, a member having intersecting horizontal and vertical arms embedded in said body, openings in said body surrounding said horizontal arms, a portion of the surface of said openings diverging outwardly from the area where said arms intersect, a cylindrical housing surrounding said body, means for securing said first structure to said horizontal arms and means for securing said second structure to said cylindrical housing.

2. A resilient mount adapted to be interposed between first and second structures, said mount comprising a cylindrical resilient body, a member having intersecting horizontal and vertical arms embedded in said body, openings in said body surrounding said horizontal arms, a portion of the surface of said openings diverging outwardly from the area where said arms intersect, a pair of semi-cylindrical shells surrounding said body, a cylindrical housing surrounding said shells, means for securing said first structure to said horizontal arms and means for securing said second structure to said cylindrical housing.

3. First and second structures, means connecting said structures, said means comprising a one-piece cylindrical resilient body, a member having a first rod embedded in said body coaxial with its axis, a two-piece cylindrical housing encasing said body, said member having a second rod perpendicular to said first rod and with its ends extending outwardly from said housing, said first structure having a cylindrical mounting bracket with an internal size less than the exterior size of said two-piece housing when it is positioned about said body and when said body is in an unstressed condition, said bracket being adapted to receive said housing and compress said body, said second structure being secured to the ends of said second rod.

References Cited in the file of this patent

UNITED STATES PATENTS

| | | |
|---|---|---|
| 2,199,004 | Lord | Apr. 30, 1940 |
| 2,369,077 | Seidel | Feb. 6, 1945 |
| 2,588,171 | Smith | Mar. 4, 1952 |
| 2,709,096 | Blaurock | May 24, 1955 |